US012777309B2

(12) United States Patent
Shen et al.

(10) Patent No.: US 12,777,309 B2
(45) Date of Patent: Oct. 27, 2026

(54) METHODS AND APPARATUSES FOR REPORTING BEHAVIOR OF TARGET APPARATUS ASSOCIATED WITH GEOGRAPHICAL AREA

(71) Applicant: NOKIA TECHNOLOGIES OY, Espoo (FI)

(72) Inventors: Yang Shen, Beijing (CN); Istvan Z. Kovacs, Aalborg (DK); Eva Perez, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 487 days.

(21) Appl. No.: 17/999,534

(22) PCT Filed: May 22, 2020

(86) PCT No.: PCT/CN2020/091832
§ 371 (c)(1),
(2) Date: Nov. 21, 2022

(87) PCT Pub. No.: WO2021/232410
PCT Pub. Date: Nov. 25, 2021

(65) Prior Publication Data

US 2023/0209305 A1 Jun. 29, 2023

(51) Int. Cl.
*H04W 4/021* (2018.01)

(52) U.S. Cl.
CPC .................................. *H04W 4/021* (2013.01)

(58) Field of Classification Search
CPC ....... H04W 4/029; H04W 4/02; H04W 64/00; H04W 24/10; H04W 4/021; H04W 88/02; H04W 64/003; H04W 4/025; H04W 4/33
See application file for complete search history.

(56) References Cited

U.S. PATENT DOCUMENTS

2004/0185870 A1 9/2004 Matsuda
2013/0252635 A1 9/2013 Zheng et al.
(Continued)

FOREIGN PATENT DOCUMENTS

CN 1518391 A 8/2004
CN 101179834 A 5/2008
(Continued)

OTHER PUBLICATIONS

3rd Generation Partnership Project; Technical Specification Group Core Network and Terminals; T8 reference point for Northbound APIs; (Release 16), 3GPP TS 29.122 V16.5.0 (Mar. 2020) (Year: 2020).*

(Continued)

*Primary Examiner* — Jing Gao
(74) *Attorney, Agent, or Firm* — ALSTON & BIRD LLP

(57) ABSTRACT

Disclosed are methods for reporting a behavior of a target apparatus associated with a geographical area. An example method may include receiving a first request to report a behavior of a target apparatus associated with a geographical area, determining whether a granularity of the geographical area is finer than a cell level granularity according to at least one of the geographical area and a region of interest associated with the geographical area, transmitting a second request to a first entity for performing a location service having a location granularity finer than the cell level granularity in a case where the granularity of the geographical area is finer than the cell level granularity, receiving a notification from the first entity on the behavior of the target apparatus associated with the geographical area, and reporting the
(Continued)

behavior of the target apparatus associated with the geographical area based on the notification. The Related apparatuses and computer readable media are also disclosed.

25 Claims, 11 Drawing Sheets

(56) References Cited

U.S. PATENT DOCUMENTS

| | | | | |
|---|---|---|---|---|
| 2015/0005004 | A1 | 1/2015 | Cuervo et al. | |
| 2015/0065165 | A1 | 3/2015 | Zhang et al. | |
| 2018/0367955 | A1 | 12/2018 | Zhong et al. | |
| 2019/0313212 | A1* | 10/2019 | Lee | H04W 4/029 |
| 2021/0345067 | A1* | 11/2021 | Zhang | H04W 4/20 |

FOREIGN PATENT DOCUMENTS

| | | | | |
|---|---|---|---|---|
| CN | 102577480 | A | 7/2012 | |
| CN | 102892196 | A | 1/2013 | |
| CN | 103190161 | A | 7/2013 | |
| CN | 103404177 | A | 11/2013 | |
| CN | 104170482 | A | 11/2014 | |
| CN | 109891916 | A | 6/2019 | |
| EP | 1673957 | A1 | 6/2006 | |
| KR | 2019 0043084 | A | 4/2019 | |
| WO | WO 2005/041604 | A1 | 5/2005 | |
| WO | WO 2012/094217 | A1 | 7/2012 | |
| WO | WO 2014/206627 | A1 | 12/2014 | |
| WO | WO 2017/148276 | A1 | 9/2017 | |
| WO | WO-2018085017 | A1 * | 5/2018 | H04W 4/20 |
| WO | WO 2020/078068 | A1 | 4/2020 | |

OTHER PUBLICATIONS

Office Action for Chinese Application No. 202080101236.8 dated Oct. 31, 2024, 26 pages.
Extended European Search Report for European Application No. 20936711.9 dated Jan. 30, 2024, 7 pages.
Office Action for Chinese Application No. 202080101236.8 dated May 29, 2024, 17 pages.
"3rd Generation Partnership Project; Technical Specification Group Services and System Aspects; 5G System (5GS) Location Services (LCS); Stage 2 (Release 16)", 3GPP TS 23.273 v16.3.0, (Mar. 2020), 94 pages.
"3rd Generation Partnership Project; Technical Specification Group Services and System Aspects; System architecture for the 5G System (5GS); Stage 2 (Release 16)", 3GPP TS 23.501 v16.4.0, (Mar. 2020), 430 pages.
"Revised SID: Study on Supporting Unmanned Aerial Systems Connectivity, Identification and Tracking", 3GPP TSG SA Meeting #87E, SP-200097, (Mar. 17-20, 2020), 4 pages.
International Search Report and Written Opinion for International Application No. PCT/CN2020/091832 dated Feb. 22, 2021, 9 pages.
Office Action for European Application No. 20936711.9 dated Jul. 16, 2025, 4 pages.
Decision to Grant for Chinese Application No. 202080101236.8 dated Mar. 3, 2025, 4 pages.

* cited by examiner

METHODS AND APPARATUSES FOR REPORTING BEHAVIOR OF TARGET APPARATUS ASSOCIATED WITH GEOGRAPHICAL AREA

CROSS-REFERENCE TO RELATED APPLICATIONS

This application is a national phase entry of International Application No. PCT/CN2020/091832, filed May 22, 2020, the contents of which are hereby incorporated by reference in their entirety.

TECHNICAL FIELD

Various example embodiments relates to methods and apparatuses for reporting a behavior of a target apparatus associated with a geographical area.

BACKGROUND

In a communication system such as a New Radio (NR or 5G) system and a Long Term Evolution (LTE) system, user equipment (UE) such as an Unmanned Aerial Vehicle (UAV) may be tracked in terms of its presence in an area having granularity in a cell level or above.

SUMMARY

In a first aspect, a method is disclosed. The method may include receiving a first request to report a behavior of a target apparatus associated with a geographical area, determining whether a granularity of the geographical area is finer than a cell level granularity according to at least one of the geographical area and a region of interest (ROI) associated with the geographical area, transmitting a second request to a first entity for performing a location service having a location granularity finer than the cell level granularity in a case where the granularity of the geographical area is finer than the cell level granularity, receiving a notification from the first entity on the behavior of the target apparatus associated with the geographical area, and reporting the behavior of the target apparatus associated with the geographical area based on the notification. For example, the method in this aspect may be performed or implemented in an entity such as Network Exposure Function (NEF), or Service Capability Exposure Function (SCEF), or the like.

In some example embodiments, the first request may include at least one of at least one of an identifier of the target apparatus, information on the geographical area, a periodic reporting interval, and a behavior to be monitored for the target apparatus associated with the geographical area, and so on. For example, a transmitter of the first request may include at least one of Unmanned Aerial System (UAS) Traffic Management (UTM), UAS Service Supplier (USS), or the like, and the behavior of the target apparatus associated with the geographical area may be reported to the transmitter of the first request. For example, the target apparatus may be a UE such as a UAV.

In some example embodiments, the behavior of the target apparatus associated with the geographical area may include at least one of moving into the geographical area, moving out the geographical area, staying in the geographical area, and so on.

In some example embodiments, the ROI may be represented by at least one of one or more cell identifiers, one or more base station identifiers, one or more tracking area identifiers, and so on.

In some example embodiments, the granularity of the geographical area may be determined as being finer than the cell level granularity in a case where a mapping ratio of at least a part of the geographical area to at least a part of the ROI associated with the part of the geographical area is lower than a predetermined threshold.

In some example embodiments, the first entity may be an entity such as Gateway Mobile Location Centre (GMLC), Home GMLC (H-GMLC), or the like.

In some example embodiments, the second request may include at least one of an identifier of the target apparatus, information on the geographical area, a periodic reporting interval, and a behavior to be monitored for the target apparatus associated with the geographical area, and so on.

In some example embodiments, the method in the first aspect may further include transmitting a third request to a second entity for performing a location service having a location granularity coarser than or equal to the cell level granularity, in response to determining that the granularity of the geographical area is finer than the cell level granularity. For example, the second request may be transmitted in response to information from the second entity indicating a presence of the target apparatus in the ROI.

In some example embodiments, the second entity may be an entity such as Access and Mobility Management Function (AMF), Mobility Management Entity (MME), or the like.

In some example embodiments, the third request may include at least one of an identifier of the target apparatus, a periodic reporting interval, a behavior to be monitored for the target apparatus associated with the geographical area, information on the ROI, and so on.

In some example embodiments, the method in the first aspect may further include transmitting a fourth request to a third entity for performing a location service having a location granularity coarser than or equal to the cell level granularity, in a case where the granularity of the geographical area is coarser than or equal to the cell level granularity.

In some example embodiments, the third entity may be an entity same as the above second entity, such as AMF, MME, or the like.

In some example embodiments, the fourth request may include at least one of an identifier of the target apparatus, a periodic reporting interval, a behavior to be monitored for the target apparatus associated with the geographical area, information on the ROI, and so on.

In a second aspect, an apparatus is disclosed. The apparatus may include at least one processor and at least one memory. The at least one memory may include computer program code, and the at least one memory and the computer program code may be configured to, with the at least one processor, cause the apparatus to perform the method in the first aspect. In some example embodiments, the at least one memory and the computer program code may be configured to, with the at least one processor, cause the apparatus to perform receiving a first request to report a behavior of a target apparatus associated with a geographical area, determining whether a granularity of the geographical area is finer than a cell level granularity according to at least one of the geographical area and a ROI associated with the geographical area, transmitting a second request to a first entity for performing a location service having a location granularity finer than the cell level granularity in a case where the granularity of the geographical area is finer than the cell level granularity, receiving a notification from the first entity on the behavior of the target apparatus associated with the geographical area, and reporting the behavior of the target apparatus associated with the geographical area based on the notification. For example, the apparatus in this aspect may be at least a part of an entity such as NEF, SCEF, or the like.

In some example embodiments, the first request may include at least one of an identifier of the target apparatus, information on the geographical area, a periodic reporting interval, and a behavior to be monitored for the target apparatus associated with the geographical area, and so on. For example, a transmitter of the first request may include at least one of UTM, USS, or the like, and the behavior of the target apparatus associated with the geographical area may be reported to the transmitter of the first request. For example, the target apparatus may be a UE such as a UAV.

In some example embodiments, the behavior of the target apparatus associated with the geographical area may include at least one of moving into the geographical area, moving out the geographical area, staying in the geographical area, and so on.

In some example embodiments, the ROI may be represented by at least one of one or more cell identifiers, one or more base station identifiers, one or more tracking area identifiers, and so on.

In some example embodiments, the granularity of the geographical area may be determined as being finer than the cell level granularity in a case where a mapping ratio of at least a part of the geographical area to at least a part of the ROI associated with the part of the geographical area is lower than a predetermined threshold.

In some example embodiments, the first entity may be an entity such as GMLC, H-GMLC, or the like.

In some example embodiments, the second request may include at least one of an identifier of the target apparatus, information on the geographical area, a periodic reporting interval, and a behavior to be monitored for the target apparatus associated with the geographical area, and so on.

In some example embodiments, the at least one memory and the computer program code may be configured to, with the at least one processor, cause the apparatus to further perform transmitting a third request to a second entity for performing a location service having a location granularity coarser than or equal to the cell level granularity, in response to determining that the granularity of the geographical area is finer than the cell level granularity. For example, the second request may be transmitted in response to information from the second entity indicating a presence of the target apparatus in the ROI.

In some example embodiments, the second entity may be an entity such as AMF, MME, or the like.

In some example embodiments, the third request may include at least one of an identifier of the target apparatus, a periodic reporting interval, a behavior to be monitored for the target apparatus associated with the geographical area, information on the ROI, and so on.

In some example embodiments, the at least one memory and the computer program code may be configured to, with the at least one processor, cause the apparatus to further perform transmitting a fourth request to a third entity for performing a location service having a location granularity coarser than or equal to the cell level granularity, in a case where the granularity of the geographical area is coarser than or equal to the cell level granularity.

In some example embodiments, the third entity may be an entity same as the above second entity, such as AMF, MME, or the like.

In some example embodiments, the fourth request may include at least one of an identifier of the target apparatus, a periodic reporting interval, a behavior to be monitored for the target apparatus associated with the geographical area, information on the ROI, and so on.

In a third aspect, an apparatus is disclosed. The apparatus may include means for performing the method in the first aspect. In some example embodiments, the apparatus may include means for receiving a first request to report a behavior of a target apparatus associated with a geographical area, means for determining whether a granularity of the geographical area is finer than a cell level granularity according to at least one of the geographical area and a ROI associated with the geographical area, means for transmitting a second request to a first entity for performing a location service having a location granularity finer than the cell level granularity in a case where the granularity of the geographical area is finer than the cell level granularity, means for receiving a notification from the first entity on the behavior of the target apparatus associated with the geographical area, and means for reporting the behavior of the target apparatus associated with the geographical area based on the notification. For example, the apparatus in this aspect may be at least a part of an entity such as NEF, SCEF, or the like.

In some example embodiments, the first request may include at least one of an identifier of the target apparatus, information on the geographical area, a periodic reporting interval, and a behavior to be monitored for the target apparatus associated with the geographical area, and so on. For example, a transmitter of the first request may include at least one of UTM, USS, or the like, and the behavior of the target apparatus associated with the geographical area may be reported to the transmitter of the first request. For example, the target apparatus may be a UE such as a UAV.

In some example embodiments, the behavior of the target apparatus associated with the geographical area may include at least one of moving into the geographical area, moving out the geographical area, staying in the geographical area, and so on.

In some example embodiments, the ROI may be represented by at least one of one or more cell identifiers, one or more base station identifiers, one or more tracking area identifiers, and so on.

In some example embodiments, the granularity of the geographical area may be determined as being finer than the cell level granularity in a case where a mapping ratio of at least a part of the geographical area to at least a part of the ROI associated with the part of the geographical area is lower than a predetermined threshold.

In some example embodiments, the first entity may be an entity such as GMLC or the like.

In some example embodiments, the second request may include at least one of an identifier of the target apparatus, information on the geographical area, a periodic reporting interval, and a behavior to be monitored for the target apparatus associated with the geographical area, and so on.

In some example embodiments, the apparatus may further include means for transmitting a third request to a second entity for performing a location service having a location granularity coarser than or equal to the cell level granularity, in response to determining that the granularity of the geographical area is finer than the cell level granularity. For example, the second request may be transmitted in response to information from the second entity indicating a presence of the target apparatus in the ROI.

In some example embodiments, the second entity may be an entity such as AMF, MME, or the like.

In some example embodiments, the third request may include at least one of an identifier of the target apparatus, a periodic reporting interval, a behavior to be monitored for the target apparatus associated with the geographical area, information on the ROI, and so on.

In some example embodiments, the apparatus may further include means for transmitting a fourth request to a third entity for performing a location service having a location granularity coarser than or equal to the cell level granularity, in a case where the granularity of the geographical area is coarser than or equal to the cell level granularity.

In some example embodiments, the third entity may be an entity same as the above second entity, such as AMF, MME, or the like.

In some example embodiments, the fourth request may include at least one of an identifier of the target apparatus, a periodic reporting interval, a behavior to be monitored for the target apparatus associated with the geographical area, information on the ROI, and so on.

In a fourth aspect, a computer readable medium is disclosed. The computer readable medium may include program instructions for causing an apparatus to perform the method in the first aspect. For example, the apparatus may be at least a part of the apparatus in the second aspect and/or the third aspect. In some embodiments, the program instructions may be used for causing the apparatus to perform receiving a first request to report a behavior of a target apparatus associated with a geographical area, determining whether a granularity of the geographical area is finer than a cell level granularity according to at least one of the geographical area and a ROI associated with the geographical area, transmitting a second request to a first entity for performing a location service having a location granularity finer than the cell level granularity in a case where the granularity of the geographical area is finer than the cell level granularity, receiving a notification from the first entity on the behavior of the target apparatus associated with the geographical area, and reporting the behavior of the target apparatus associated with the geographical area based on the notification.

In some example embodiments, the first request may include at least one of an identifier of the target apparatus, information on the geographical area, a periodic reporting interval, and a behavior to be monitored for the target apparatus associated with the geographical area, and so on. For example, a transmitter of the first request may include at least one of UTM, USS, or the like, and the behavior of the target apparatus associated with the geographical area may be reported to the transmitter of the first request. For example, the target apparatus may be a UE such as a UAV.

In some example embodiments, the behavior of the target apparatus associated with the geographical area may include at least one of moving into the geographical area, moving out the geographical area, staying in the geographical area, and so on.

In some example embodiments, the ROI may be represented by at least one of one or more cell identifiers, one or more base station identifiers, one or more tracking area identifiers, and so on.

In some example embodiments, the granularity of the geographical area may be determined as being finer than the cell level granularity in a case where a mapping ratio of at least a part of the geographical area to at least a part of the ROI associated with the part of the geographical area is lower than a predetermined threshold.

In some example embodiments, the first entity may be an entity such as GMLC, H-GMLC, or the like.

In some example embodiments, the second request may include at least one of an identifier of the target apparatus, information on the geographical area, a periodic reporting interval, and a behavior to be monitored for the target apparatus associated with the geographical area, and so on.

In some example embodiments, the program instructions may be used for causing the apparatus to further perform transmitting a third request to a second entity for performing a location service having a location granularity coarser than or equal to the cell level granularity, in response to determining that the granularity of the geographical area is finer than the cell level granularity. For example, the second request may be transmitted in response to information from the second entity indicating a presence of the target apparatus in the ROI.

In some example embodiments, the second entity may be an entity such as AMF, MME, or the like.

In some example embodiments, the third request may include at least one of an identifier of the target apparatus, a periodic reporting interval, a behavior to be monitored for the target apparatus associated with the geographical area, information on the ROI, and so on.

In some example embodiments, the program instructions may be used for causing the apparatus to further perform transmitting a fourth request to a third entity for performing a location service having a location granularity coarser than or equal to the cell level granularity, in a case where the granularity of the geographical area is coarser than or equal to the cell level granularity.

In some example embodiments, the third entity may be an entity same as the above second entity, such as AMF, MME, or the like.

In some example embodiments, the fourth request may include at least one of an identifier of the target apparatus, a periodic reporting interval, a behavior to be monitored for the target apparatus associated with the geographical area, information on the ROI, and so on.

In a fifth aspect, a method is disclosed. The method may include receiving a request for reporting a behavior of a target apparatus associated with a geographical area finer than a cell level granularity, performing, in response to the request, a service to obtain a geographical location of the target apparatus, determining the behavior of the target apparatus associated with the geographical area based on the geographical location of the target apparatus and the geographical area, and reporting the behavior of the target apparatus associated with the geographical area. For example, the method in this aspect may be performed or implemented in an entity such as GMLC or the like. For example, the target apparatus may be a UE such as a UAV.

In some example embodiments, the request may include at least one of an identifier of the target apparatus, information on the geographical area, a periodic reporting interval, and a behavior to be monitored for the target apparatus associated with the geographical area. For example, the transmitter of the request may be NEF, SCEF, or the like.

In some example embodiments, the performing the service may include transmitting at least one of a periodic reporting interval and information on the ROI to the target apparatus. For example, a deferred location service may be triggered by the target apparatus periodically. For example, the ROI may be represented by at least one of one or more cell identifiers, one or more base station identifiers, and one or more tracking area identifiers.

In some example embodiments, the performing the service may include transmitting periodically at least one another request to an entity for performing a location. For example, the at least one another request may be transmitted periodically. In some example embodiments, the entity to which the another request is transmitted may be an entity such as AMF, MME, or the like. In some example embodiments, the another request may include an identifier of the target apparatus. For example, the entity may perform an immediate location service, for example by cooperating with an entity such as Location Management Function (LMF), Evolved Serving Mobile Location Centre (E-SMLC), or the like.

In some example embodiments, the method may further include receiving a notification of the service on the geographical location of the target apparatus. For example, the notification may be received from an entity such as LMF, E-SMLC, or the like.

In some example embodiments, the behavior of the target apparatus associated with the geographical area may include at least one of moving into the geographical area, moving out the geographical area, staying in the geographical area, and so on.

In a sixth aspect, an apparatus is disclosed. The apparatus may include at least one processor and at least one memory. The at least one memory may include computer program code, and the at least one memory and the computer program code may be configured to, with the at least one processor, cause the apparatus to perform the method in the fifth aspect. In some example embodiments, the at least one memory and the computer program code may be configured to, with the at least one processor, cause the apparatus to perform receiving a request for reporting a behavior of a target apparatus associated with a geographical area finer than a cell level granularity, performing, in response to the request, a service to obtain a geographical location of the target apparatus, determining the behavior of the target apparatus associated with the geographical area based on the geographical location of the target apparatus and the geographical area, and reporting the behavior of the target apparatus associated with the geographical area. For example, the apparatus in this aspect may be at least a part of an entity such as GMLC, H-GMLC, or the like. For example, the target apparatus may be a UE such as a UAV.

In some example embodiments, the request may include at least one of an identifier of the target apparatus, information on the geographical area, a periodic reporting interval, and a behavior to be monitored for the target apparatus associated with the geographical area. For example, the transmitter of the request may be NEF, SCEF, or the like.

In some example embodiments, the performing the service may include transmitting at least one of a periodic reporting interval and information on the ROI to the target apparatus. For example, a deferred location service may be triggered by the target apparatus periodically. For example, the ROI may be represented by at least one of one or more cell identifiers, one or more base station identifiers, and one or more tracking area identifiers.

In some example embodiments, the performing the service may include transmitting periodically at least one another request to an entity for performing a location. For example, the at least one another request may be transmitted periodically. In some example embodiments, the entity to which the another request is transmitted may be an entity such as AMF, MME, or the like. In some example embodiments, the another request may include an identifier of the target apparatus. For example, the entity may perform an immediate location service, for example by cooperating with an entity such as LMF, E-SMLC, or the like.

In some example embodiments, the at least one memory and the computer program code may be configured to, with the at least one processor, cause the apparatus to further perform receiving a notification of the service on the geographical location of the target apparatus. For example, the notification may be received from an entity such as LMF, E-SMLC, or the like.

In some example embodiments, the behavior of the target apparatus associated with the geographical area may include at least one of moving into the geographical area, moving out the geographical area, staying in the geographical area, and so on.

In a seventh aspect, an apparatus is disclosed. The apparatus may include means for performing the method in the fifth aspect. In some example embodiments, the apparatus may include means for receiving a request for reporting a behavior of a target apparatus associated with a geographical area finer than a cell level granularity, means for performing, in response to the request, a service to obtain a geographical location of the target apparatus, means for determining the behavior of the target apparatus associated with the geographical area based on the geographical location of the target apparatus and the geographical area, and means for reporting the behavior of the target apparatus associated with the geographical area. For example, the apparatus in this aspect may be at least a part of an entity such as GMLC or the like. For example, the target apparatus may be a UE such as a UAV.

In some example embodiments, the request may include at least one of an identifier of the target apparatus, information on the geographical area, a periodic reporting interval, and a behavior to be monitored for the target apparatus associated with the geographical area. For example, the transmitter of the request may be NEF, SCEF, or the like.

In some example embodiments, the performing the service may include transmitting at least one of a periodic reporting interval and information on the ROI to the target apparatus. For example, a deferred location service may be triggered by the target apparatus periodically. For example, the ROI may be represented by at least one of one or more cell identifiers, one or more base station identifiers, and one or more tracking area identifiers.

In some example embodiments, the performing the service may include transmitting periodically at least one another request to an entity for performing a location. For example, the at least one another request may be transmitted periodically. In some example embodiments, the entity to which the another request is transmitted may be an entity such as AMF, MME, or the like. In some example embodiments, the another request may include an identifier of the target apparatus. For example, the entity may perform an immediate location service, for example by cooperating with an entity such as LMF, E-SMLC, or the like.

In some example embodiments, the apparatus may further include means for receiving a notification of the service on the geographical location of the target apparatus. For example, the notification may be received from an entity such as LMF, E-SMLC, or the like.

In some example embodiments, the behavior of the target apparatus associated with the geographical area may include at least one of moving into the geographical area, moving out the geographical area, staying in the geographical area, and so on.

In an eighth aspect, a computer readable medium is disclosed. The computer readable medium may include program instructions for causing an apparatus to perform the method in the fifth aspect. For example, the apparatus may be at least a part of the apparatus in the sixth aspect and/or the seventh aspect. In some embodiments, the program instructions may be used for causing the apparatus to perform receiving a request for reporting a behavior of a target apparatus associated with a geographical area finer than a cell level granularity, performing, in response to the request, a service to obtain a geographical location of the target apparatus, determining the behavior of the target apparatus associated with the geographical area based on the geographical location of the target apparatus and the geographical area, and reporting the behavior of the target apparatus associated with the geographical area. For example, the target apparatus may be a UE such as a UAV.

In some example embodiments, the request may include at least one of an identifier of the target apparatus, information on the geographical area, a periodic reporting interval, and a behavior to be monitored for the target apparatus associated with the geographical area. For example, the transmitter of the request may be NEF, SCEF, or the like.

In some example embodiments, the ROI may be represented by at least one of one or more cell identifiers, one or more base station identifiers, and one or more tracking area identifiers.

In some example embodiments, the performing the service may include transmitting at least one of a periodic reporting interval and information on the ROI to the target apparatus. For example, a deferred location service may be triggered by the target apparatus periodically.

In some example embodiments, the performing the service may include transmitting periodically at least one another request to an entity for performing a location. For example, the at least one another request may be transmitted periodically. In some example embodiments, the entity to which the another request is transmitted may be an entity such as AMF, MME, or the like. In some example embodiments, the another request may include an identifier of the target apparatus. For example, the entity may perform an immediate location service, for example by cooperating with an entity such as LMF, E-SMLC, or the like.

In some example embodiments, the program instructions may be used for causing the apparatus to further perform receiving a notification of the service on the geographical location of the target apparatus. For example, the notification may be received from an entity such as LMF, E-SMLC, or the like.

In some example embodiments, the behavior of the target apparatus associated with the geographical area may include at least one of moving into the geographical area, moving out the geographical area, staying in the geographical area, and so on.

DETAILED DESCRIPTION

Some example embodiments will be described, by way of non-limiting examples, with reference to the accompanying drawings.

Figure 1:
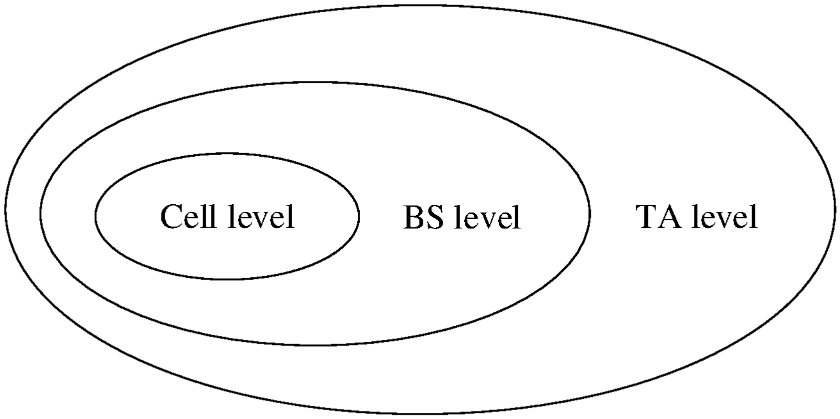
FIG. 1 illustrates examples of granularities in an embodiment.

A behavior of a target apparatus (for example, a UE such as a UAV), such as moving into a geographical area, moving out the geographical area, staying in the geographical area, and so on, may be tracked in different levels of granularity. For example, as illustrated in FIG. 1, a cell level granularity, a base station (BS, e.g. eNB in the LTE system or gNB in the NR system) level granularity which may be coarser than the cell level granularity, and a tracking area (TA) level granularity which may be coarser than the BS level granularity, and so on, may be supported according to different application requirements.

When to track behaviors of a target apparatus with respect to a geographical area, the geographical area may be mapped onto a ROI which may be represented one or more cell identifiers, or one or more eNB identifiers, or one or more gNB identifiers, or one or more TA identifiers, or a combination of one or more the aforementioned identifiers, or the like. For example, the geographical area may be segmented into parts for example by any suitable patterns such as squares and triangles. Then, one or more cells including respective parts and thus covering the geographical area may be determined, for example according to the geographical locations (e.g. longitude and latitude) and/or areas of respective parts and respective cells.

Figure 2:
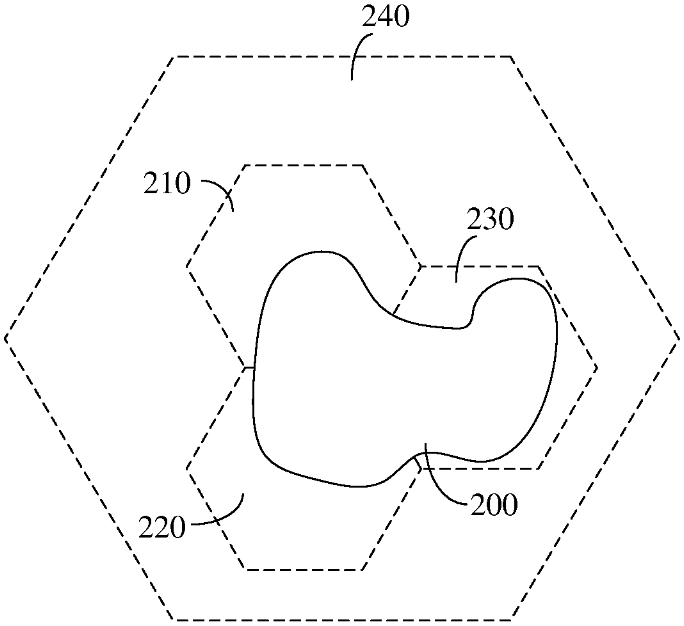
FIG. 2 illustrates examples of geographical areas and ROIs in an embodiment.

For example, as illustrated in FIG. 2, a geographical area 200 across cells 210, 220, and 230 may be mapped on to a ROI including the cells 210, 220, and 230, and the mapped ROI may be represented by a list of identifiers of the cells 210, 220, and 230. Further, for example, as illustrated in FIG. 2, if the cells 210, 220, and 230 are included in a TA 240, the geographical area 200 may be also mapped to another ROI which may be represented by the identifier of the TA 240. Compared with the ROI represented by the list of identifiers of the cells 210, 220, and 230, the ROI represented by the identifier of the TA 240 may have a coarser granularity.

Figure 3:
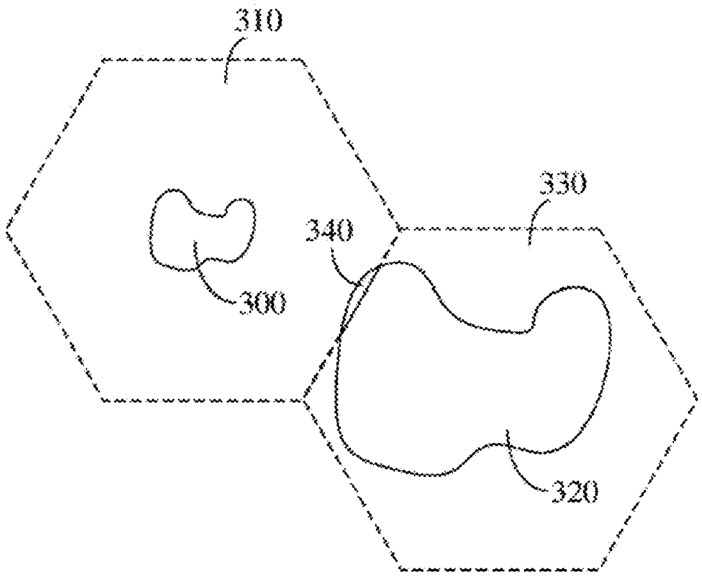
FIG. 3 illustrates examples of geographical areas and ROIs in an embodiment.

In some scenarios such as geo-fencing, a granularity finer than the cell level granularity may be needed. As illustrated in FIG. 3, for a geographical area 300 whose granularity may be finer than the cell level granularity (e.g., a building in a dense urban, or a workshop in a factory, or a police office) and a cell 310 including the geographical area 300 (e.g., having a coverage area with e.g. 50-100 m radius), for example, a tracking failure or error may be encountered when to map this geographical area 300 onto a ROI represented by the identifier of the cell 310 and to use the cell level granularity to track the behavior of a target apparatus associated with the geographical area 300. For example, moving into the ROI represented by the identifier of the cell 310 may not mean also moving into the geographical area 300. Further, a geographical area may have an irregular shape, and may have a part covered by one or more cells. For example, also as illustrated in FIG. 3, a major part of the geographical area 320 is in the cell 330, and a small part 340 of the geographical area 320 is in the cell 310. Thus, for example, tracking accuracy may be degraded when mapping the geographical area 320 onto a ROI represented by the identifiers of the cells 310 and 330 and using the cell level granularity.

Figure 4:
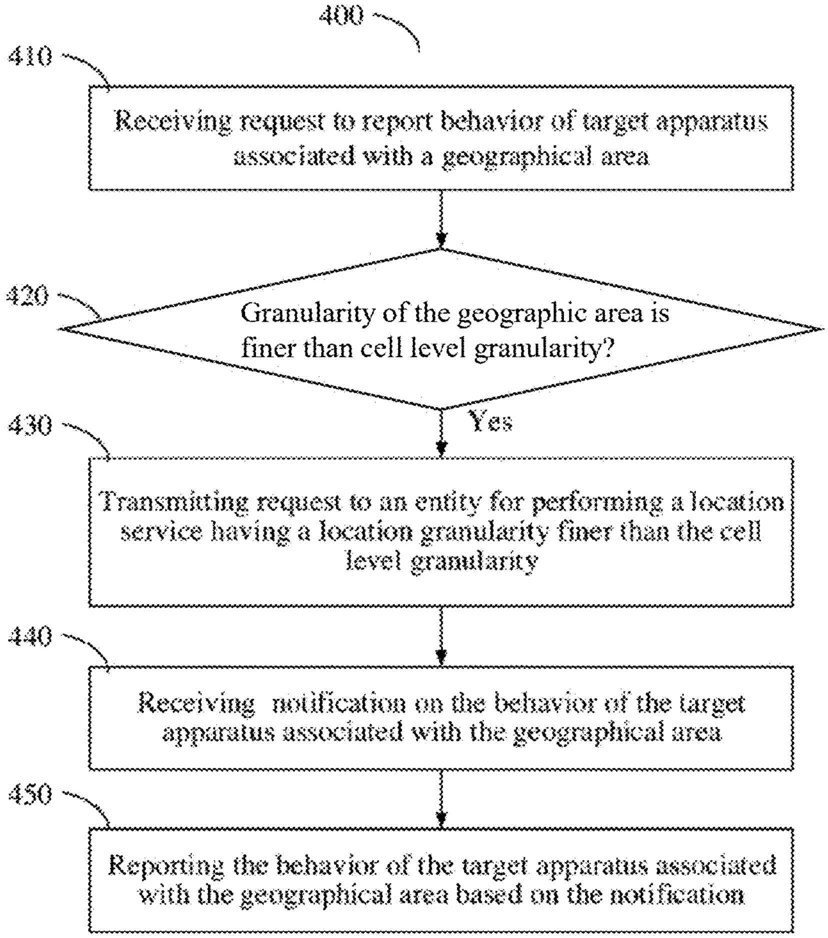
FIG. 4 illustrates an example method in an embodiment.

FIG. 4 illustrates an example method 400 for reporting a behavior of a target apparatus associated with a geographical area.

As illustrated in FIG. 4, the example method 400 may include a step 410 of receiving a request to report a behavior of a target apparatus associated with a geographical area, a step 420 of determining whether a granularity of the geographical area is finer than a cell level granularity according to at least one of the geographical area and a ROI associated with the geographical area, a step 430 of transmitting a request to an entity for performing a location service having a location granularity finer than the cell level granularity in a case where the granularity of the geographical area is finer than the cell level granularity, a step 440 of receiving a notification from the entity on the behavior of the target apparatus associated with the geographical area, and a step 450 of reporting the behavior of the target apparatus associated with the geographical area based on the notification.

In the example method 400, the granularity of the geographical area to be monitored may be checked to determine whether it is finer than the cell level granularity, and a request may be transmitted to the entity for performing a location service having a location granularity finer than the cell level granularity in a case where the granularity of the geographical area is determined as being finer than the cell level granularity. Then, the behavior of the target apparatus associated with the geographical area may be determined based on the notification from the entity for performing the location service having a location granularity finer than the cell level granularity. Thus, for example, the behavior of the target apparatus associated with a geographical area having a finer granularity than the cell level granularity may be determined and reported.

Figure 5:
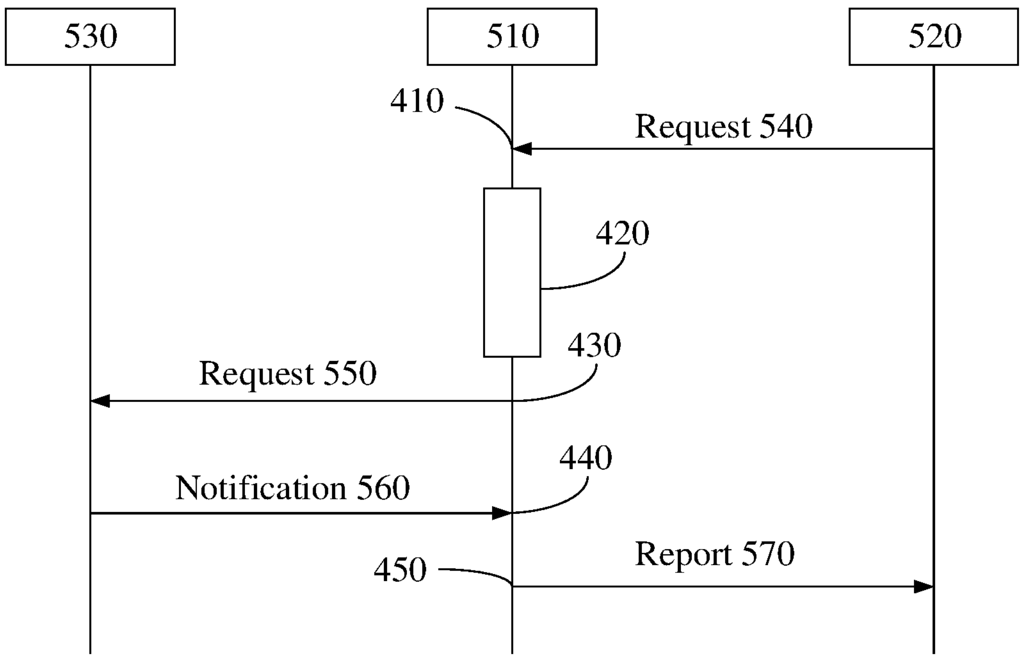
FIG. 5 illustrates an example execution of the example method in an embodiment.

FIG. 5 illustrates an example sequence among the entities involved in the example method 400. The entity 510 may be an entity configured to perform the example method 400, for example, may be at least a part of NEF or SCEF or the like. The entity 520 may be an entity requesting for reporting a behavior of a target apparatus associated with a geographical area, for example, may be at least one of UTM, UAS, and the like. The entity 530 may be the entity utilized in the example method 400 for performing a location service having a location granularity finer than the cell level granularity, for example, may be GMLC, H-GMLC, or the like. In various embodiments, the target apparatus may be any suitable UE, such as a UAV.

As illustrated in FIG. 5, the entity 510 may receive a request 540 in the step 410 of the example method 400, where the request 540 may indicate the entity 510 to report a behavior of a target apparatus associated with a geographical area. For example, if the entity 510 is at least a part of NEF in an Home Public Land Mobile Network (HPLMN) and the entity 520 is external to the HPLMN including both the entity 510 and the entity 530, the request 540 may be a Location Service (LCS) Request to the NEF in the HPLMN using an NEF Application Interface (API). If the entity 510 is at least a part of NEF in an HPLMN and the entity 520 is also included in the HPLMN together with both the entity 510 and the entity 530, Nnef_EventExposure_Subscribe service request may be transmitted as the request 540.

For example, the request 540 may include at least one of an identifier of the target apparatus, information on the geographical area, a periodic reporting interval, a behavior to be monitored for the target apparatus associated with the geographical area, and so on, so that, for example, one or more specified behaviors may be monitored and reported for the specified target apparatus in a specified geographical area. For example, the information on the geographical area may include, but not is not limited to, one or more of: longitudes and/or latitudes and/or altitudes of one or more points in the geographical area, an area of the geographical area, positions (e.g. direction, angle, and so on) of one or more points in the geographical area relative to a reference point, coordinates of a bounding box of the geographical area, and so on. For example, the behavior to be monitored for the target apparatus associated with the geographical area may include one or more of the target apparatus moving into the geographical area, the target apparatus moving out the geographical area, the target apparatus staying in the geographical area, and so on.

Then, the entity 510 may perform the step 420 of the example method 400 to determine whether the granularity of the geographical area is finer than a cell level granularity according to at least one of the geographical area and a ROI associated with the geographical area. For example, in the step 420, the entity 510 may mapping the geographical area onto a ROI. Such a ROI may represented by at least one of one or more cell identifiers, one or more BS identifiers, one or more TA identifiers, and so on, and may be also called as "the ROI associated with the geographical area". For example, the granularity of the geographical area is determined as being finer than the cell level granularity if failed to mapping the geographical area exactly onto a ROI represented by one or more cell identifiers, for example, if a mapping ratio of at least a part of the geographical area to at least a part of the ROI associated with the part of the geographical area is lower than a predetermined threshold.

Figure 6:
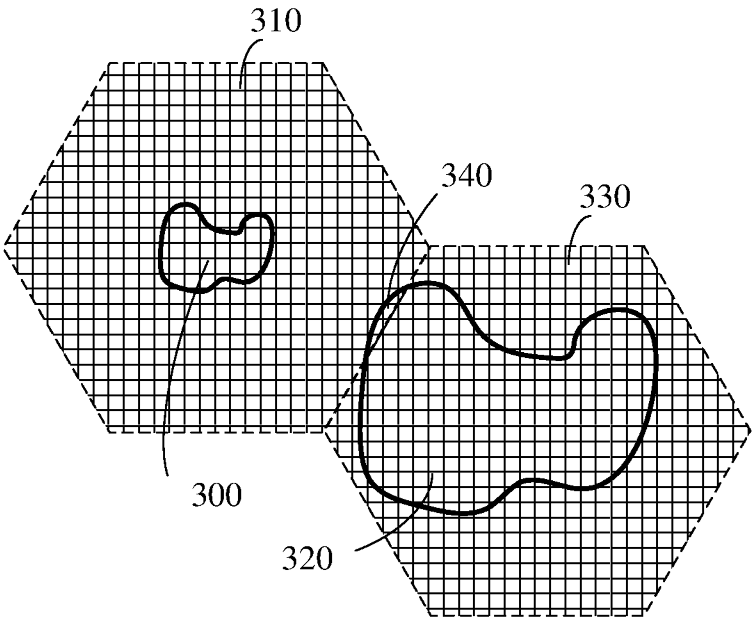
FIG. 6 illustrates an example execution of the example method in an embodiment.

For example, as illustrated in FIG. 6, for the geographical areas 300, 320 and the cells 310, 330, the geographical area 300 may be mapped onto the ROI which corresponds to the cell 310 and may be represented by the identifier of the cell 310. As illustrated in FIG. 6, the geographical area 300 and/or the cell 310 may be segmented into a plurality of parts by small squares. Then, a ratio of the number of the small squares occupied by the geographical area 300 to the number of the small squares occupied by the cell 310, which is also called a mapping ratio, may be determined/calculated. If the ratio satisfies a predetermined condition, for example, if the ratio is less than a predetermined threshold (e.g. 50%, 60%, or the like), the granularity of the geographical area 300 may be determined as being finer than the cell level granularity. Similarly, for the geographical area 320, a ratio of the number of the small squares occupied by the part 340 of the geographical area 320 to the number of the small squares occupied by the cell 310, and/or a ratio of the number of the small squares occupied by the geographical area 320 to the number of the small squares occupied by both the cell 310 and the cell 330, may be determined/calculated. If the ratio satisfies a predetermined condition, for example, if the ratio is less than a predetermined threshold (e.g. 50%, 60%, or the like), the granularity of the geographical area 320 may be determined as being finer than the cell level granularity.

It is appreciated that the manner of determining whether the granularity of a geographical area is finer than the cell level granularity is not limited to the above examples. For example, if a geographical area cannot be mapped exactly onto a ROI corresponding to one or more cells, the granularity of the geographical area may be determined as being finer than the cell level granularity. For example, the granularity of a geographical area may be determined as being finer than the cell level granularity according to another parameter for example provided in the request 540, or the granularity of the geographical area may be determined as being finer than the cell level granularity if it is determined that the geographical area has an irregular outline, and so on.

Back to FIG. 5, if the granularity of a geographical area is determined as being finer than the cell level granularity in the step 420, the entity 510 may further perform the step 430 of the example method 400. As illustrated in FIG. 5, the entity 510 may further transmit a request 550 to the entity 530. The entity 530 may perform a location service having a location granularity finer than the cell level granularity, for example, at least a part of C-MT-LR procedure or 5GC-MT-LR procedure defined in 3GPP (3rd Generation Partnership Project) Technical Standard TS23.273 for periodic, triggered or UE available location events. For example, the entity 530 may be GMLC, H-GMLC, or the like, which may in the same HPLMN with the entity 510. For example, if the entity 510 is NEF and the entity 530 is H-GMLC, the request 550 may be an Ngmlc_Location_ProvideLocation Request. For example, the request 550 may include at least one of an identifier of the target apparatus, information on the geographical area, a periodic reporting interval, a behavior to be monitored for the target apparatus associated with the geographical area, and so on, so that, for example, the entity 530 may notify the entity 510 on the behavior of the target apparatus associated with the specified geographical area, for example by a specific periodic reporting interval.

Then, entity 510 may wait for the notification(s) from the entity 530. When the entity 510 received a notification 560 from the entity 530 on the behavior of the target apparatus associated with the geographical area in the step 440. For example, if the entity 510 is NEF and the entity 530 is H-GMLC, the notification 560 from the entity 530 may be Ngmlc_Location_EventNotify.

Then, the entity 510 may further report the behavior of the target apparatus associated with the geographical area based on the notification 560 in the step 450 of the example method 400. For example, in the step 450, the entity 510 may forward the notification 560 to the entity 520, or the entity 510 may generate a report 570 based on the notification 560 on the behavior of the target apparatus associated with the geographical area and then transmit the report 570 to the entity 520, or the like. For example, if the entity 520 is external to the HPLMN including the entity 510, the report 570 may be a LCS Response transmitted by using the NEF API. If the entity 520 is also in the HPLMN including the entity 510, the report 570 may be Nnef_EventExposure_Notify.

Figure 7:
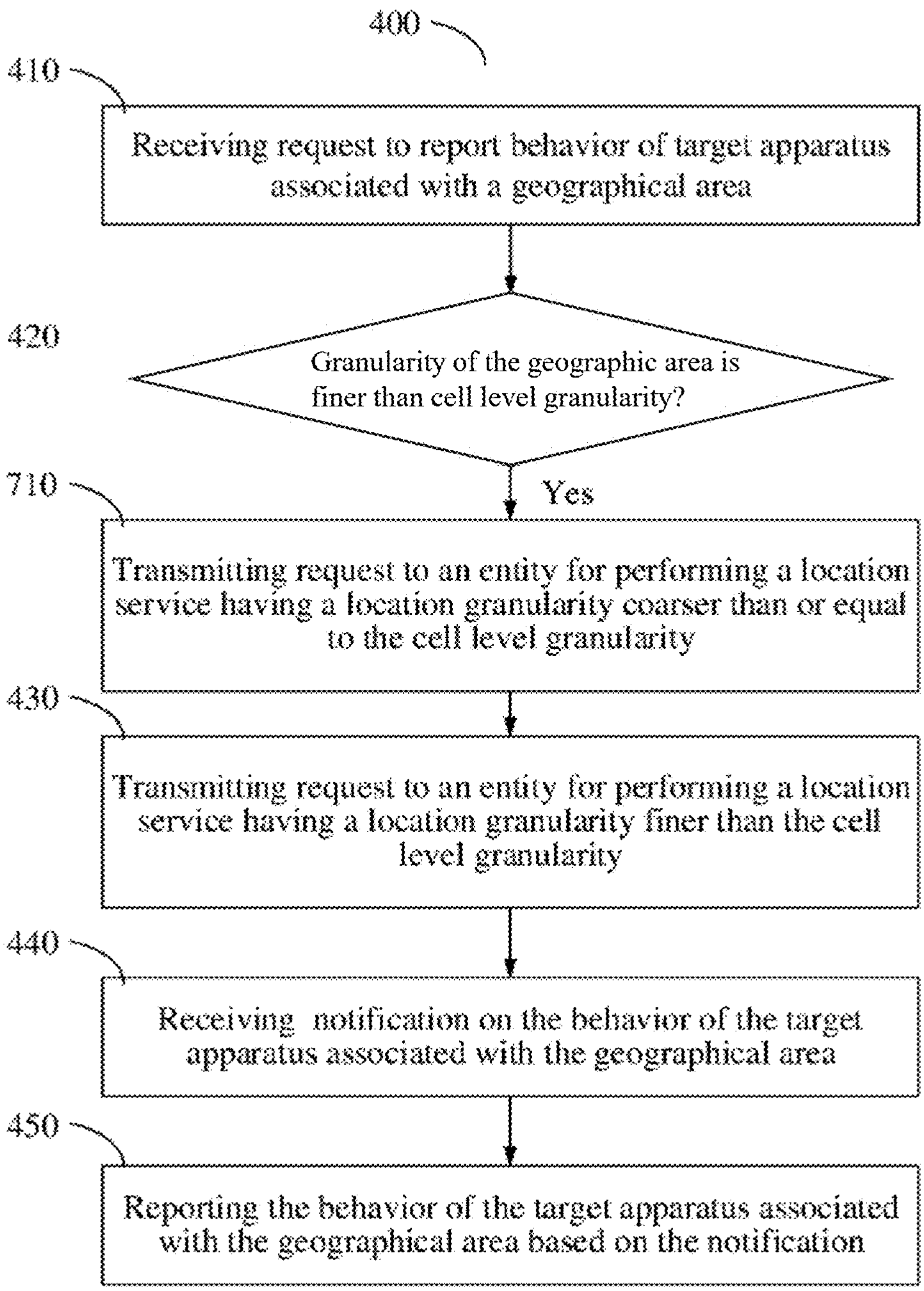
FIG. 7 illustrates an example method in an embodiment.

In some embodiments, as illustrated in FIG. 7, the example method 400 may further include a step 710 of transmitting a request to an entity for performing a location service having a location granularity coarser than or equal to the cell level granularity, in response to determining that the granularity of the geographical area is finer than the cell level granularity in the step 420. Then, the step 430 may be performed in response to information from the entity in the step 710 indicating a presence of the target apparatus in a ROI.

Figure 8:
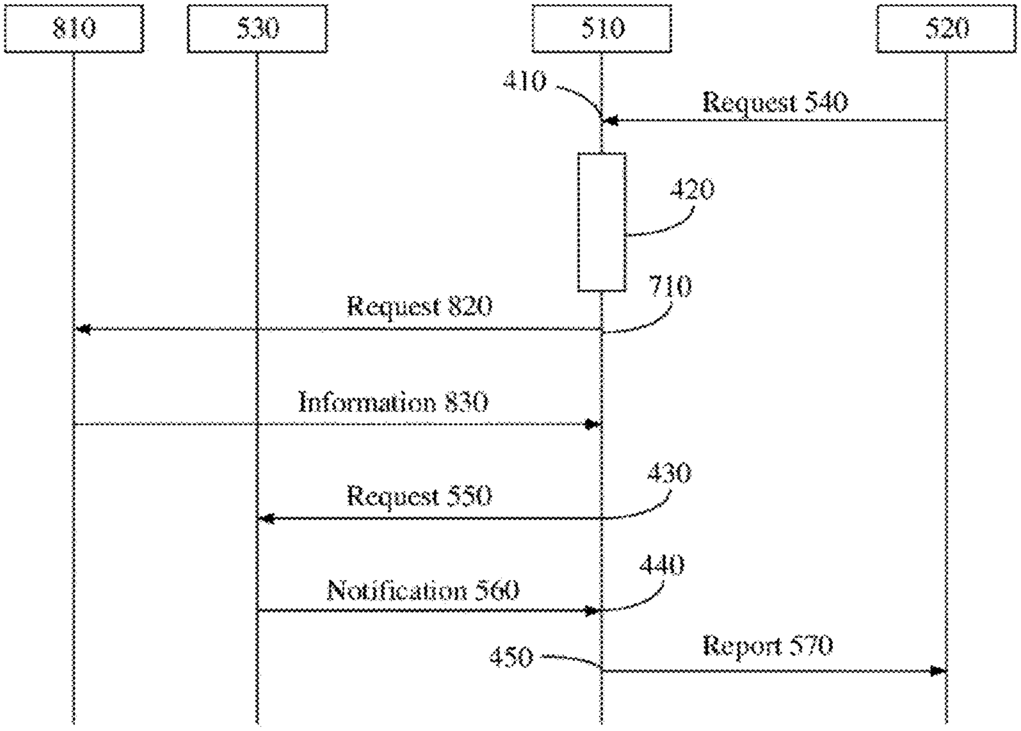
FIG. 8 illustrates an example execution of the example method in an embodiment.

For example, as illustrated in FIG. 8, before performing the step 430, the entity 510 may transmit a request 820 to an entity 810 in the step 710. The entity 810 may be an entity such as AMF, MME, or the like, which may be in a Visited Public Land Mobile Network (VPLMN) (roaming) or an HPLMN (non-roaming), may perform a location service having a location granularity coarser than or equal to the cell level granularity, for example AMF location service. For example, the request 820 may include at least one of an identifier of the target apparatus, a periodic reporting interval, a behavior to be monitored for the target apparatus associated with the geographical area, information on the ROI (e.g. the identifiers used to expressed the ROI), and so on. For example, if the entity 810 is AMF and the entity 510 is NEF, the request 820 may be a Namf_EventExposure_Subscribe Request.

Then, the entity 510 may receive information 830 from the entity 810. For example, the information 830 may indicate whether the target apparatus is in the ROI. If the information 830 indicates that the target apparatus is in the ROI, the entity 510 may transmit the request 550 to the entity 530 in the step 420 so as to perform a location service having a location granularity finer than the cell level granularity. For example, if the entity 810 is AMF, the information 830 may be Namf_EventExposure_Notify.

The location service having a location granularity finer than the cell level granularity performed by the entity 530 (e.g. C-MT-LR procedure or 5GC-MT-LR procedure for periodic, triggered or UE available location events) may involve lots of signaling. Through the step 710, the finer location service may be performed conditionally based on the information returned by a coarser location service, and thus total signaling may be reduced.

Figure 9:
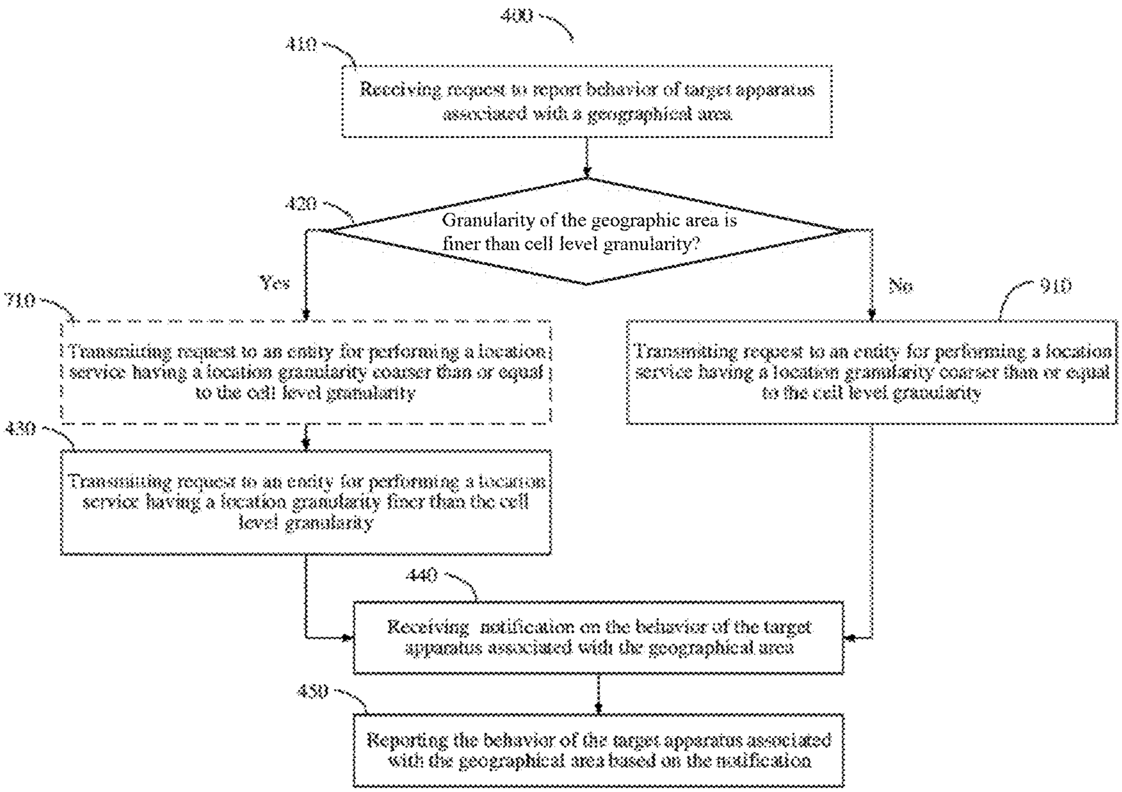
FIG. 9 illustrates an example method in an embodiment.

In some embodiments, as illustrated in FIG. 9 where the optional step 710 is shown in dotted lines, the example method 400 may further include a step 910 of transmitting a request to an entity for performing a location service having a location granularity coarser than or equal to the cell level granularity (e.g. a procedure for reporting NEF by AMF on UE presence in an area of interest as defined in the 3GPP TS23.501), in a case where the granularity of the geographical area is coarser than or equal to the cell level granularity. Thus, depending on the check result of the step 420, if the granularity of the geographical area is finer than the cell level granularity, the steps 710 (optional), 430, 440, and 450 may be performed to report the behavior of the target apparatus in the specified geographical area based on a finer location procedure. If the granularity of the geographical area is coarser than or equal to the cell level granularity, the steps 910, 410, and 450 may be performed to report the behavior of the target apparatus in a ROI based on a coarser location procedure.

Figure 10:
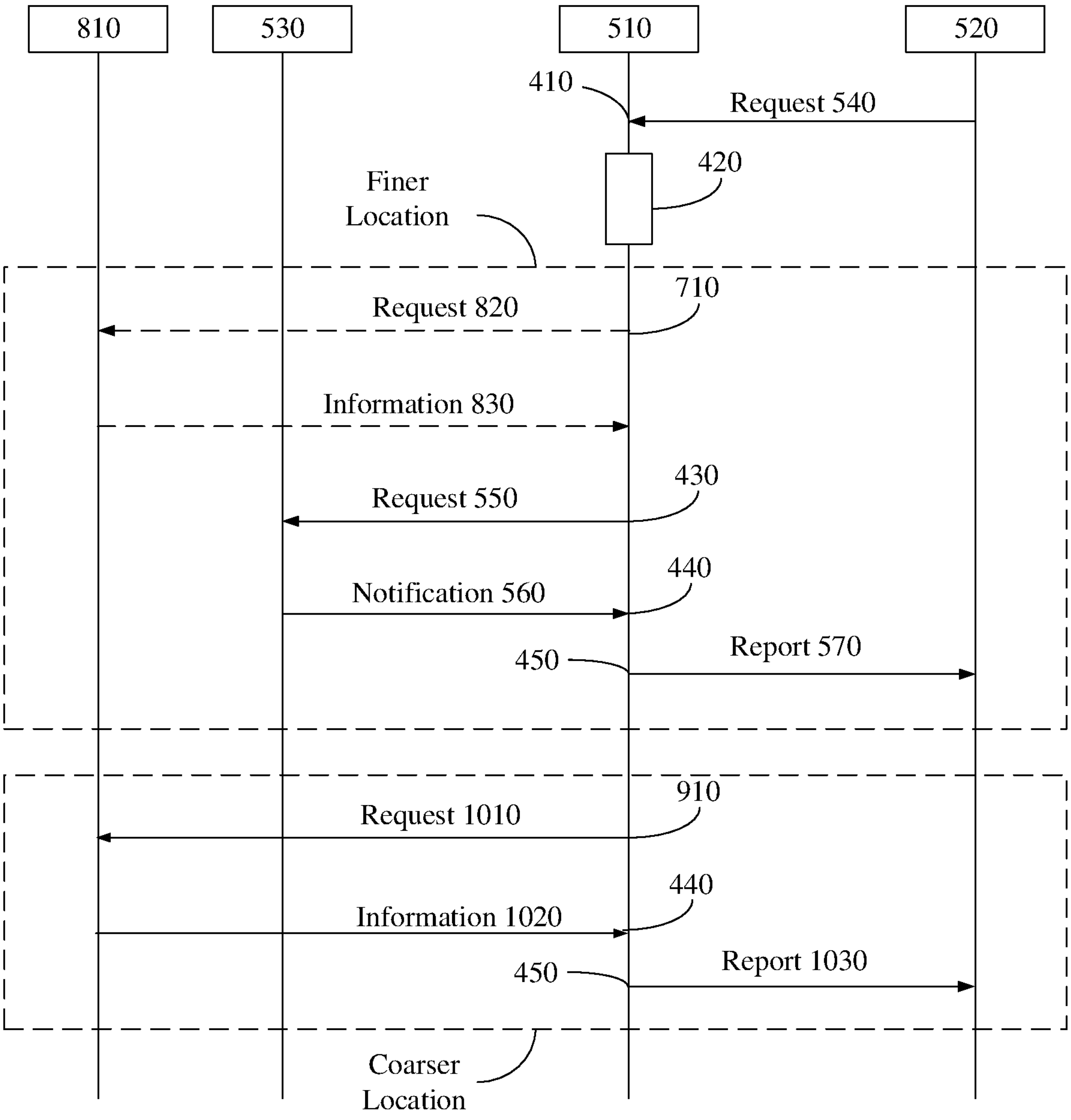
FIG. 10 illustrates an example execution of the example method in an embodiment.

For example, as illustrated in FIG. 10, if the granularity of the geographical area is coarser than or equal to the cell level granularity, the entity 510 may transmit a request 1010 to the entity 810. Similar to the request 820 transmitted to the entity 810 in a case where the granularity of the geographical area is finer than the cell level granularity, the request 1010 may also include at least one of an identifier of the target apparatus, a periodic reporting interval, a behavior to be monitored for the target apparatus associated with the geographical area, information on the ROI, and so on. For example, if the entity 810 is AMF and the entity 510 is NEF, the request 820 may be a Namf_EventExposure_Subscribe Request.

Then, the entity 510 may receive information 1020 from the entity 810. Similar to the information 830, for example, the information 1020 may indicate whether the target apparatus is in the ROI. For example, if the entity 810 is AMF, the information 830 may be Namf_EventExposure_Notify.

Then, the entity 510 may further report the behavior of the target apparatus associated with the geographical area based on the information 1020. For example, in the step 450, the entity 510 may forward the information 1020 to the entity 520, or the entity 510 may generate a report 1030 based on the information 1020 on the behavior of the target apparatus associated with the geographical area and then transmit the report 1030 to the entity 520, or the like. For example, similar to the transmission of the report 570, if the entity 520 is external to the HPLMN including the entity 510, the report 1030 may be a LCS Response transmitted by using the NEF API. If the entity 520 is also in the HPLMN including the entity 510, the report 1030 may be Nnef_EventExposure_Notify.

It is appreciated that the example method 400 may be not limited to the above examples, and for clarity, one or more signaling among entities are omitted. For example, after transmitting the request 550 to the entity 530, the entity 510 may receiving a response from the entity 530 to confirm the request.

Figure 11:
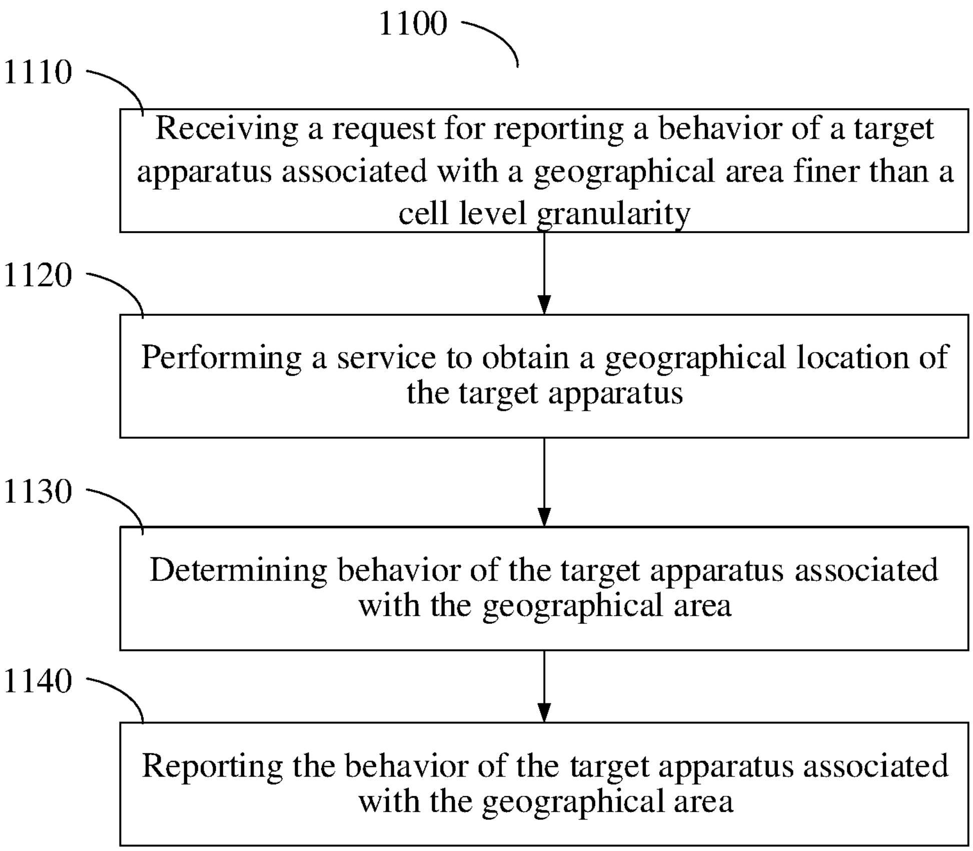
FIG. 11 illustrates an example method in an embodiment.

FIG. 11 illustrates an example method 1100 performed in the entity 530 in response to the request 550 from the entity 510.

As illustrated in FIG. 11, the example method 1100 may include a step 1110 of receiving a request for reporting a behavior of a target apparatus associated with a geographical area finer than a cell level granularity, a step 1120 of performing a service to obtain a geographical location of the target apparatus, a step 1130 of determining the behavior of the target apparatus associated with the geographical area based on the geographical location of the target apparatus and the geographical area, and a step 1140 of reporting the behavior of the target apparatus associated with the geographical area.

The step 1110 in the example method 1100 may correspond to the step 430 in the example method 400, and the step 1140 in the example method 1100 may correspond to the step 440 in the example method 400. For example, the request received by the entity 530 in the step 1110 may be the request transmitted by the entity 510 in the step 430 of the example method 400, and the notification 560 received by the entity 510 in the step 440 of the example method 400 may be the notification reported by the entity 530 in the step 1140 of the example method 1110. Thus, the aspects and features describe above with respect to the example method 400 may be also applied to, implemented in, or combined with the example method 1100. For example, the request received by the entity 530 in the step 1110 may at least one of a periodic reporting interval and information on the geographical area, and the behavior of the target apparatus to be reported in the step 1140 may also include at least one of moving into the geographical area, moving out the geographical area, staying in the geographical area, and so on.

Figure 12:
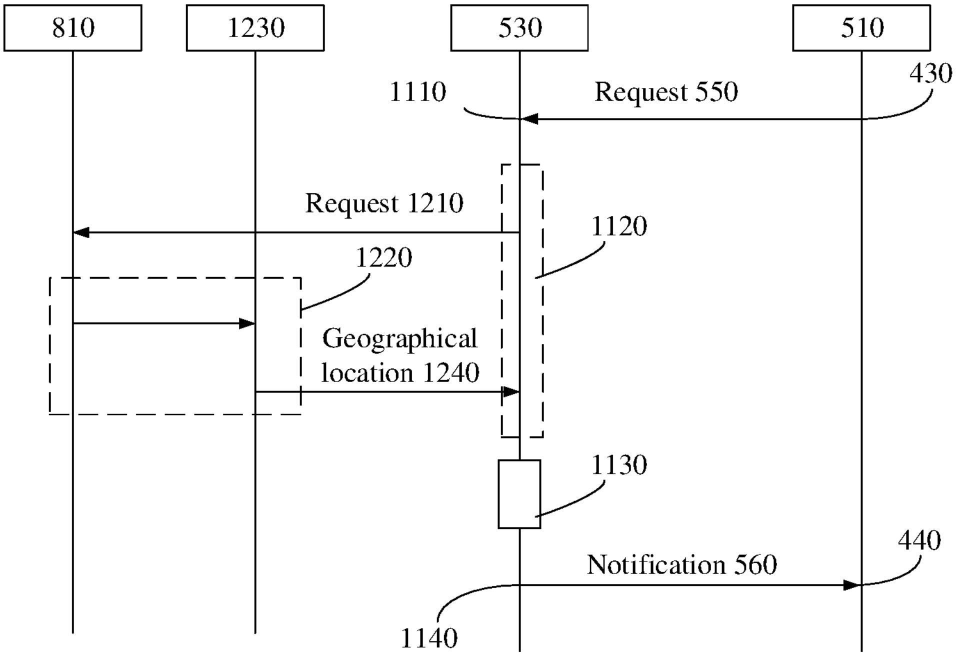
FIG. 12 illustrates an example execution of the example method in an embodiment.

In the step 1120 of the example method 1100, in an embodiment, for example as illustrated in FIG. 12, the entity 530 may transmit at least one request 1210 to the entity 810, for example periodically. For example, the request 1210 may include the identifier of the target apparatus. Then, the entity 810 may trigger an immediate location service 1220 to obtain the geographical location of the target apparatus. For example, the entity 810 may trigger an immediate C-MT-LR Procedure which may also involves an entity 1230 such as LMF, or E-SMLC, or the like. Then, as illustrated in FIG. 12, the entity 530 may receive a notification 1240 of the service 1220 on the geographical location of the target apparatus.

Figure 13:
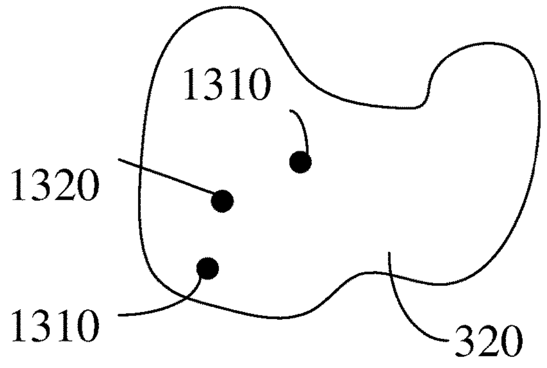
FIG. 13 illustrates an example execution of the example method in an embodiment.

Then, in the step 1130, the entity 530 may determine the behavior of the target apparatus associated with the geographical area, for example by comparing the geographical location obtained in the step 1120 and the edge of the geographical area and/or the ROI associated with the geographical area. For example, as illustrated in FIG. 13, the geographical location 1310 of the target apparatus is obtained at a timing $t_1$, the geographical location 1320 of the target apparatus is obtained at a timing $t_2$ after $t_1$, the geographical location 1330 of the target apparatus is obtained at a timing $t_3$ after $t_2$. If the geographical location 1320 is closer to the edge of the geographical area 320 than the geographical location 1310, and the geographical location 1330 is closer to the edge of the geographical area 320 than the geographical location 1320, the entity 530 may determine, in the step 1130, that the behavior of the target apparatus is moving out the geographical area 320.

Figure 14:
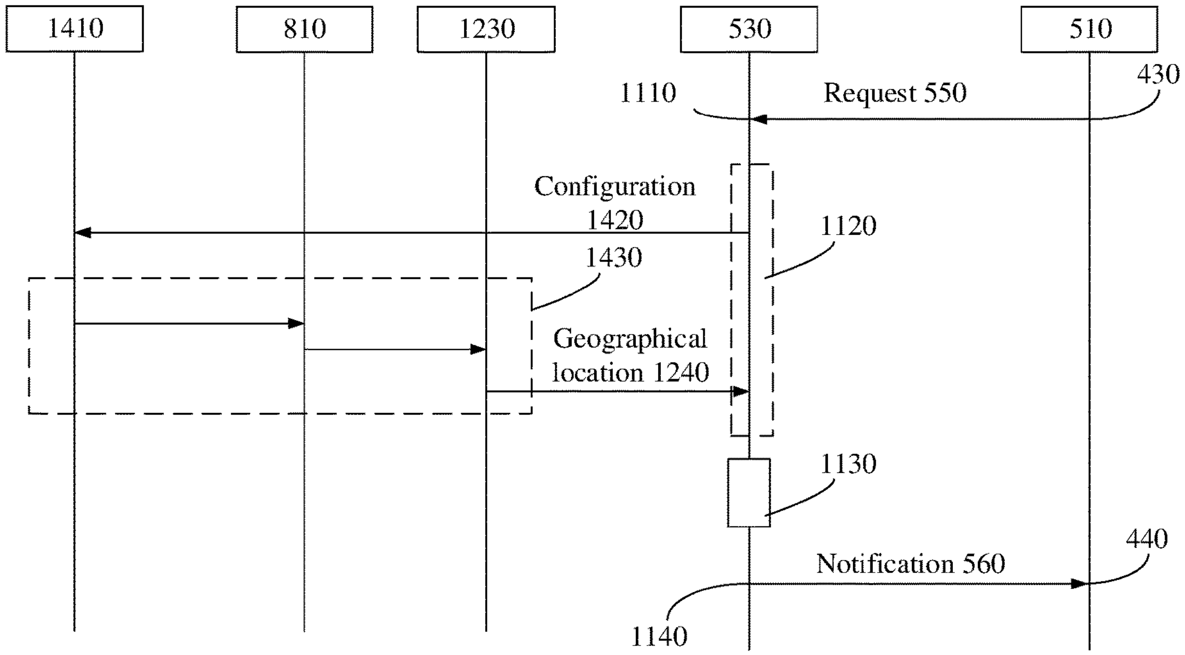
FIG. 14 illustrates an example execution of the example method in an embodiment.

In an embodiment, for example as illustrated in FIG. 14, in the step 1120, the entity 530 may transmit a configuration 1420 including a periodic reporting interval to the target apparatus 1410. Then, the target apparatus 1410 may trigger a deferred location service 1120 periodically, for example according to the periodic reporting interval in the configuration 1420. For example, the target apparatus 1410 may trigger a deferred C-MT-LR Procedure to obtain the geographical location 1240 of the apparatus 1410.

In another embodiment, the configuration 1420 may also include the information on the ROI associated with the geographical area. Thus, the target apparatus 1410 may trigger a deferred location service 1120 periodically when the target apparatus 1410 is in the ROI.

Through providing configuration including at least one of periodic reporting interval and information on the ROI associated with the geographical area, signaling of the location service may be reduced.

Figure 15:
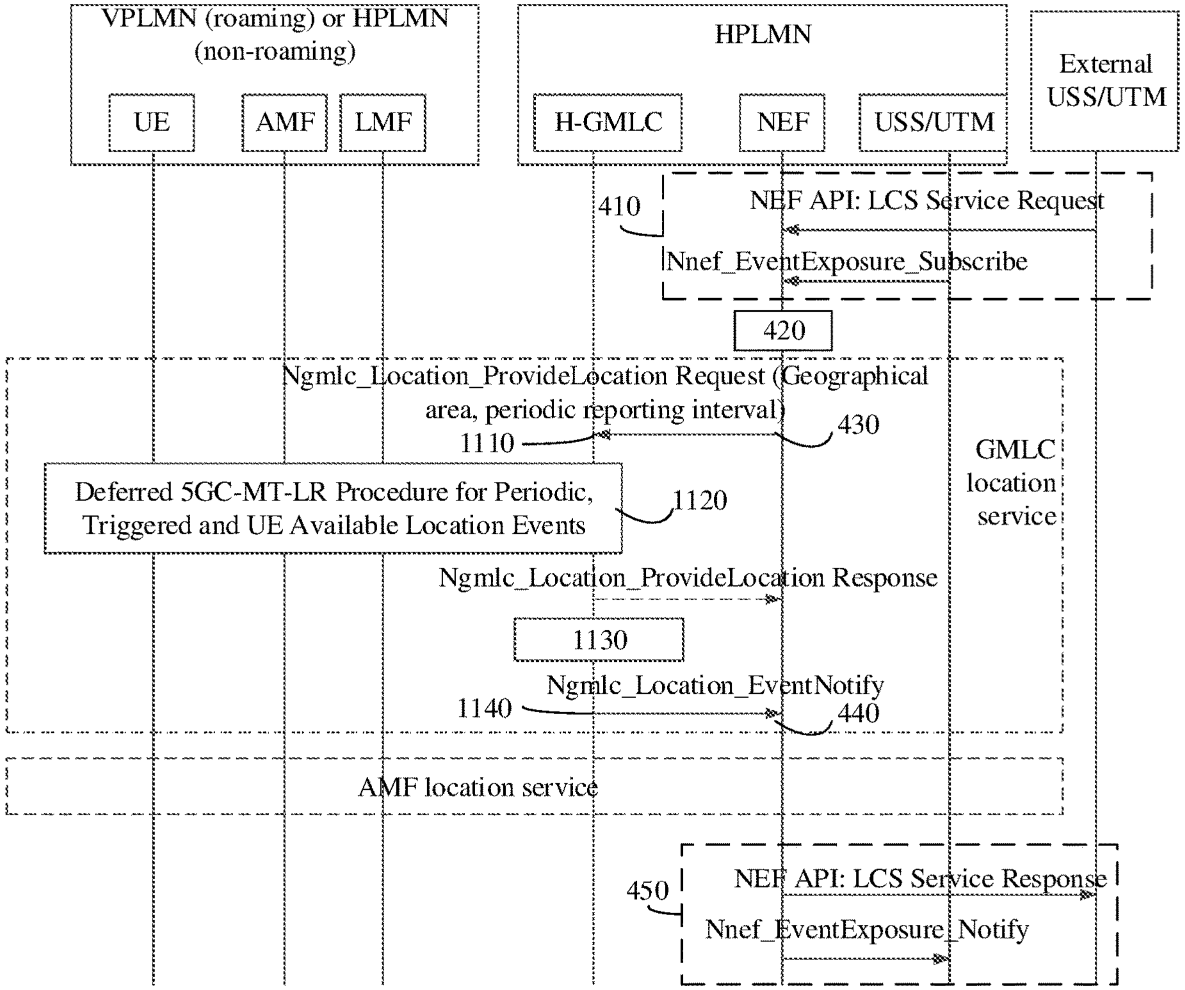
FIG. 15 illustrates an example execution of the example method in an embodiment.

FIG. 15 illustrates an example sequence in a context of NR system when applying the above example methods 400 and 1100, where the external USS/UTM and the USS/UTM in the HPLMN may be examples of the above entity 520, NEF may be an example of the above entity 510, H-GMLC may be an example of the above entity 530, AMF may be an example of the above entity 810, LMF may be an example of the entity cooperating with the entity 810 to perform the location service having a location granularity finer than the cell level granularity, UE such as UAV may be an example of the target apparatus 1410, GMLC location service may be an example of the location service having a location granularity finer than the cell level granularity in the above examples, and AMF location service may be an example of the location service having a location granularity coarser than or equal to the cell level granularity in the above examples.

It is appreciated that the example methods 400 and 1100 are not limited to the above examples.

Figure 16:
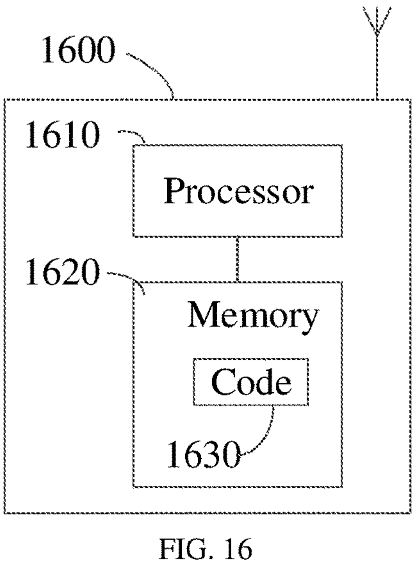
FIG. 16 illustrates an example apparatus in an embodiment.

FIG. 16 illustrates an example apparatus 1600 for reporting a behavior of a target apparatus associated with a geographical area, which, for example, may be implemented in or as at least a part of an entity such as NEF or SCEF.

As shown in FIG. 16, the example apparatus 1600 may include at least one processor 1610 and at least one memory 1620 that may include computer program code 1630. The at least one memory 1620 and the computer program code 1630 may be configured to, with the at least one processor 1610, cause the apparatus 1600 at least to perform at least the example method 400 described above.

In various example embodiments, the at least one processor 1610 in the example apparatus 1600 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 1610 may also include at least one other circuitry or element not shown in FIG. 16.

In various example embodiments, the at least one memory 1620 in the example apparatus 1600 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 1620 may include, but are not limited to, an electric, a magnetic, an optical, an electromagnetic, an infrared, or a semiconductor system, apparatus, or device or any combination of the above.

Further, in various example embodiments, the example apparatus 1600 may also include at least one other circuitry, element, and interface, for example at least one I/O interface, at least one antenna element, and the like.

In various example embodiments, the circuitries, parts, elements, and interfaces in the example apparatus 1600, including the at least one processor 1610 and the at least one memory 1620, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the entity such as NEF or SCEF is not limited to the above example apparatus 1600.

Figure 17:
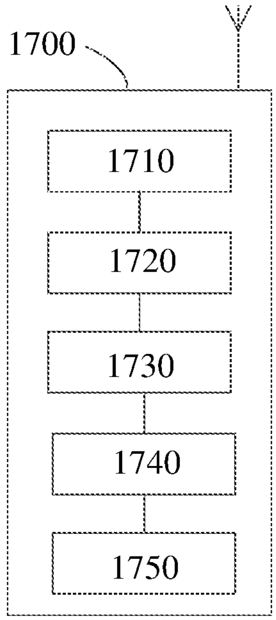
FIG. 17 illustrates an example apparatus in an embodiment.

FIG. 17 illustrates another example apparatus 1700 for reporting a behavior of a target apparatus associated with a geographical area, which, for example, may be implemented in or as at least a part of an entity such as NEF or SCEF.

As shown in FIG. 17, the example apparatus 1700 may include means 1710 for performing the step 410 of the example method 400, means 1720 for performing the step 420 of the example method 400, means 1730 for performing the step 430 of the example method 400, means 1740 for performing the step 440 of the example method 400, and means 1750 for performing the step 450 of the example method 400. In one or more another example embodiments, at least one I/O interface, at least one antenna element, and the like may also be included in the example apparatus 1700. For example, in another embodiments, the example apparatus 1700 may also include means for transmitting a request to an entity for performing a location service having a location granularity coarser than or equal to the cell level granularity, in response to determining that the granularity of the geographical area is finer than the cell level granularity, and/or means for transmitting a request to an entity for performing a location service having a location granularity coarser than or equal to the cell level granularity, in a case where the granularity of the geographical area is coarser than or equal to the cell level granularity.

In some example embodiments, examples of means in the example apparatus 1700 may include circuitries. For example, an example of means 1710 may include a circuitry configured to perform the step 410 of the example method 400, an example of means 1720 may include a circuitry configured to perform the step 420 of the example method 400, and so on. In some example embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Figure 18:
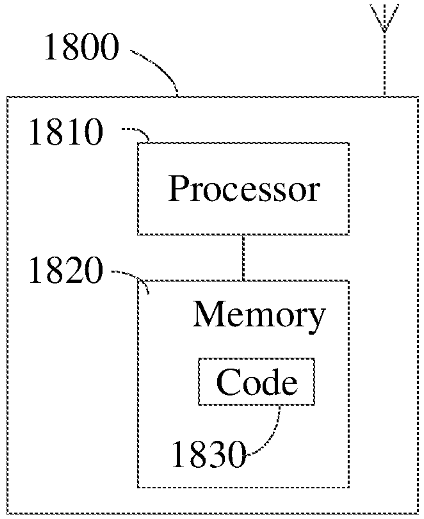
FIG. 18 illustrates an example apparatus in an embodiment.

FIG. 18 illustrates example apparatus 1800 which may cooperate with the above example apparatus 1600 and/or the example apparatus 1700. For example, the example apparatus 1800 may be implemented in or as at least a part of an entity such as GMLC, H-GMLC, or the like.

As shown in FIG. 18, the example apparatus 1800 may include at least one processor 1810 and at least one memory 1820 that may include computer program code 1830. The at least one memory 1820 and the computer program code 1830 may be configured to, with the at least one processor 1810, cause the apparatus 1800 at least to perform at least the example method 1100 described above.

In various example embodiments, the at least one processor 1810 in the example apparatus 1800 may include, but not limited to, at least one hardware processor, including at least one microprocessor such as a CPU, a portion of at least one hardware processor, and any other suitable dedicated processor such as those developed based on for example FPGA and ASIC. Further, the at least one processor 1810 may also include at least one other circuitry or element not shown in FIG. 18.

In various example embodiments, the at least one memory 1820 in the example apparatus 1800 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 1820 may include, but are not limited to, an electric, a magnetic, an optical, an electromagnetic, an infrared, or a semiconductor system, apparatus, or device or any combination of the above.

Further, in various example embodiments, the example apparatus 1800 may also include at least one other circuitry, element, and interface, for example at least one I/O interface, at least one antenna element, and the like.

In various example embodiments, the circuitries, parts, elements, and interfaces in the example apparatus 1800, including the at least one processor 1810 and the at least one memory 1820, may be coupled together via any suitable connections including, but not limited to, buses, crossbars, wiring and/or wireless lines, in any suitable ways, for example electrically, magnetically, optically, electromagnetically, and the like.

Figure 19:
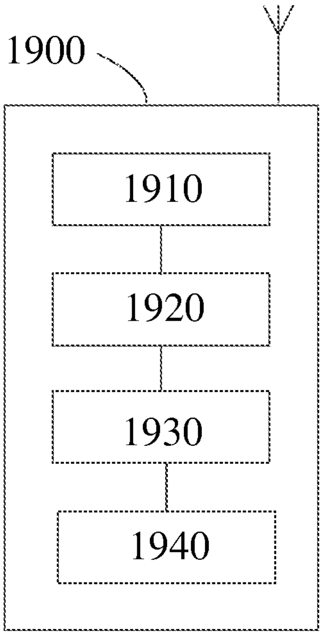
FIG. 19 illustrates an example apparatus in an embodiment.

FIG. 19 illustrates another example apparatus 1900 which may cooperate with the above example apparatus 1600 and/or the example apparatus 1700. For example, the example apparatus 1900 may be implemented in or as at least a part of an entity such as GMLC, H-GMLC, or the like.

As shown in FIG. 19, the example apparatus 1900 may include means 1910 for performing the step 1110 of the example method 1100, means 1920 for performing the step 1120 of the example method 1100, means 1930 for performing the step 1130 of the example method 1100, and means 1940 for performing the step 1140 of the example method 1100. In one or more another example embodiments, at least one I/O interface, at least one antenna element, and the like may also be included in the example apparatus 1900.

In some example embodiments, the means comprises at least one processor; and at least one memory including computer program code, the at least one memory and computer program code configured to, with the at least one processor, cause the performance of the apparatus 1900.

In some example embodiments, examples of means in the example apparatus 1900 may include circuitries. For example, an example of means 1910 may include a circuitry configured to perform the step 1110 of the example method 1100, an example of means 1920 may include a circuitry configured to perform the step 1120 of the example method 1100, and so on. In some example embodiments, examples of means may also include software modules and any other suitable function entities.

It is appreciated that the disclosure is not limited to the above example embodiments.

Another example embodiment may be related to a computer readable medium having such computer program codes or instructions stored thereon. In various example embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the term "communication system" refers to a system following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication system may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT).

The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the some embodiments described above can be combined to provide further embodiments. The accompanying claims and their equivalents are intended to cover such forms or modifications as would fall within the scope and spirit of the disclosure.

What is claimed is:

1. A method comprising:

receiving, by a Network Exposure Function (NEF) or a Service Capability Exposure Function (SCEF), a first request to report a behavior of a target apparatus associated with a geographical area;

determining, by the NEF or the SCEF, whether a granularity of the geographical area is finer than a cell level granularity according to at least one of the geographical area and a region of interest (ROI) associated with the geographical area, wherein the granularity of the geographical area is determined as being finer than the cell level granularity based upon an instance in which the geographical area cannot be mapped exactly onto the ROI associated with the geographical area;

transmitting a second request from the NEF or the SCEF to a first entity for performing a location service having a location granularity finer than the cell level granularity, in a case where the granularity of the geographical area is finer than the cell level granularity;

receiving, by the NEF or the SCEF, a notification from the first entity on the behavior of the target apparatus associated with the geographical area; and reporting, by the NEF or the SCEF, the behavior of the target apparatus associated with the geographical area based on the notification.

2. The method of claim 1 wherein the first request includes at least one of an identifier of the target apparatus, information on the geographical area, a periodic reporting interval, and a behavior to be monitored for the target apparatus associated with the geographical area.

3. The method of claim 1 wherein the behavior of the target apparatus associated with the geographical area includes at least one of moving into the geographical area, moving out the geographical area, and staying in the geographical area.

4. The method of claim 1 wherein the ROI is represented by at least one of one or more cell identifiers, one or more base station identifiers, and one or more tracking area identifiers.

5. The method of claim 1 wherein the granularity of the geographical area is determined as being finer than the cell level granularity in a case where a mapping ratio of at least a part of the geographical area to at least a part of the ROI associated with the part of the geographical area is lower than a predetermined threshold.

6. The method of claim 1 wherein the second request includes at least one of an identifier of the target apparatus, information on the geographical area, a periodic reporting interval, and a behavior to be monitored for the target apparatus associated with the geographical area.

7. The method of claim 1 further comprising:

transmitting a third request from the NEF or the SCEF to a second entity for performing a location service having a location granularity coarser than or equal to the cell level granularity, in response to determining that the granularity of the geographical area is finer than the cell level granularity.

8. The method of claim 7 wherein the second request is transmitted in response to information from the second entity indicating a presence of the target apparatus in the ROI.

9. The method of claim 7 wherein the third request includes at least one of an identifier of the target apparatus, a periodic reporting interval, a behavior to be monitored for the target apparatus associated with the geographical area, and information on the ROI.

10. The method of claim 1 further comprising:

transmitting a fourth request from the NEF or the SCEF to a third entity for performing a location service having a location granularity coarser than or equal to the cell level granularity, in a case where the granularity of the geographical area is coarser than or equal to the cell level granularity.

11. The method of claim 10 wherein the fourth request includes at least one of an identifier of the target apparatus, a periodic reporting interval, a behavior to be monitored for the target apparatus associated with the geographical area, and information on the ROI.

12. A non-transitory computer readable medium comprising instructions stored thereon for causing an apparatus to perform the method of claim 1.

13. A method comprising:

receiving, by a location service entity, a first request for reporting a behavior of a target apparatus associated with a geographical area finer than a cell level granularity, wherein the geographical area is determined to be finer than the cell level granularity according to at least one of the geographical area and a region of interest (ROI) associated with the geographical area and based upon an instance in which the geographical area cannot be mapped exactly onto the ROI associated with the geographical area;

performing, by the location service entity in response to the first request, a service to obtain a geographical location of the target apparatus;

determining, by the location service entity, the behavior of the target apparatus associated with the geographical area based on the geographical location of the target apparatus and the geographical area; and reporting, by the location service entity, the behavior of the target apparatus associated with the geographical area.

14. The method of claim 13 wherein the first request includes at least one of an identifier of the target apparatus, information on the geographical area, a periodic reporting interval, and a behavior to be monitored for the target apparatus associated with the geographical area.

15. The method of claim 13 wherein the performing the service comprises:

transmitting at least one of a periodic reporting interval and information on the region of interest (ROI) to the target apparatus.

16. The method of claim 15 wherein the ROI is represented by at least one of one or more cell identifiers, one or more base station identifiers, and one or more tracking area identifiers.

17. The method of claim 13 wherein the performing the service comprises:

transmitting periodically at least one second request to an entity for performing a location.

18. The method of claim 17 wherein the second request includes an identifier of the target apparatus.

19. The method of claim 13 further comprising:

receiving, by the location service entity, a notification of the service on the geographical location of the target apparatus.

20. The method of claim 13 wherein the behavior of the target apparatus associated with the geographical area includes at least one of moving into the geographical area, moving out the geographical area, and staying in the geographical area.

21. A non-transitory computer readable medium comprising instructions stored thereon for causing an apparatus to perform the method of claim 13.

22. The method of claim 13 wherein the location service entity comprises a Gateway Mobile Location Centre (GMLC).

23. The method of claim 13 wherein the location service entity comprises a Home Gateway Mobile Location Centre (H-GMLC).

24. An apparatus comprising:

at least one processor; and at least one memory including computer program code, the at least one memory and the computer program code being configured to, with the at least one processor, cause the apparatus to perform:

receiving a first request to report a behavior of a target apparatus associated with a geographical area;

determining whether a granularity of the geographical area is finer than a cell level granularity according to at least one of the geographical area and a region of interest (ROI) associated with the geographical area, wherein the granularity of the geographical area is determined as being finer than the cell level granularity based upon an instance in which the geographical area cannot be mapped exactly onto the ROI associated with the geographical area;

transmitting a second request to a first entity for performing a location service having a location granularity finer than the cell level granularity, in a case where the granularity of the geographical area is finer than the cell level granularity;

receiving a notification from the first entity on the behavior of the target apparatus associated with the geographical area; and reporting the behavior of the target apparatus associated with the geographical area based on the notification.

25. An apparatus comprising:

at least one processor; and at least one memory including computer program code, the at least one memory and the computer program code being configured to, with the at least one processor, cause the apparatus to perform:

receiving a first request for reporting a behavior of a target apparatus associated with a geographical area finer than a cell level granularity, wherein the geographical area is determined to be finer than the cell level granularity according to at least one of the geographical area and a region of interest (ROI) associated with the geographical area and based upon an instance in which the geographical area cannot be mapped exactly onto the ROI associated with the geographical area;

performing, in response to the first request, a service to obtain a geographical location of the target apparatus;

determining the behavior of the target apparatus associated with the geographical area based on the geographical location of the target apparatus and the ROI associated with the geographical area; and reporting the behavior of the target apparatus associated with the geographical area.

* * * * *